United States Patent
Devasia et al.

(10) Patent No.: US 11,435,742 B2
(45) Date of Patent: Sep. 6, 2022

(54) METHOD FOR CONTROLLING AUTONOMOUS AGENTS USING SELF-REINFORCEMENT

(71) Applicant: University of Washington, Seattle, WA (US)

(72) Inventors: Santosh Devasia, Seattle, WA (US); Anuj Tiwari, Seattle, WA (US)

(73) Assignee: University of Washington, Seattle, WA (US)

( * ) Notice: Subject to any disclaimer, the term of this patent is extended or adjusted under 35 U.S.C. 154(b) by 108 days.

(21) Appl. No.: 16/717,934

(22) Filed: Dec. 17, 2019

(65) Prior Publication Data
US 2020/0192370 A1 Jun. 18, 2020

Related U.S. Application Data

(60) Provisional application No. 62/781,483, filed on Dec. 18, 2018.

(51) Int. Cl.
*G05D 1/00* (2006.01)
*G08G 1/01* (2006.01)
(Continued)

(52) U.S. Cl.
CPC ......... *G05D 1/0088* (2013.01); *G05D 1/0293* (2013.01); *G05D 1/0295* (2013.01);
(Continued)

(58) Field of Classification Search
CPC .. G05D 1/0088; G05D 1/0293; G05D 1/0295; G05D 1/0291; G05D 1/0289;
(Continued)

(56) References Cited

U.S. PATENT DOCUMENTS

| 8,352,111 B2 * | 1/2013 | Mudalige ............... G08G 1/164 342/458 |
| 8,781,727 B1 * | 7/2014 | Bonawitz ............... G05D 1/104 701/410 |

(Continued)

FOREIGN PATENT DOCUMENTS

| CN | 101901012 | 12/2010 |
| CN | 103971160 | 8/2014 |

(Continued)

OTHER PUBLICATIONS

Attanasi et al., "Information Transfer and Behavioural Inertia in Starling Flocks," Nature Physics, vol. 10, No. 9, Sep. 1, 2014, pp. 615-698, Jul. 27, 2014.

(Continued)

*Primary Examiner* — Christian Chace
*Assistant Examiner* — Shayne M. Gilbertson
(74) *Attorney, Agent, or Firm* — Kilpatrick Townsend & Stockton LLP

(57) ABSTRACT

The behavior of automated agents, such as autonomous vehicles, drones, and the like, can be improved by control systems and methods that implement a combination of neighbor following behavior, or neighbor-averaged information transfer, with delayed self-reinforcement by utilizing time-delayed movement data to modify course corrections of each automated agent. Disclosed herein are systems and methods by which a follower agent, or a multiple follower agents in formation with a plurality of automated agents, can be controlled by generating course correction data for each follower agent based on the movement of neighboring agents in formation, and augmenting the course correction data based on time-delayed movement data of the follower agent. The delayed self-reinforcement behavior can (i) increase the information-transfer rate between autonomous agents without requiring an increased, individual update- (Continued)

rate; and (ii) cause superfluid-like information transfer between the autonomous agents, resulting in improvements in formation-keeping performance of the autonomous agents.

18 Claims, 9 Drawing Sheets

(51) Int. Cl.
    *G08G 1/00*     (2006.01)
    *G05D 1/02*     (2020.01)
    *G08G 5/00*     (2006.01)

(52) U.S. Cl.
    CPC .............. *G08G 1/0129* (2013.01); *G08G 1/22* (2013.01); *G08G 5/0069* (2013.01); *G05D 2201/0213* (2013.01)

(58) Field of Classification Search
    CPC ........ G05D 1/0287; G05D 1/104; G08G 1/22; G08G 1/0129; G08G 5/0008; B64C 39/024

See application file for complete search history.

(56) References Cited

U.S. PATENT DOCUMENTS

| | | | |
|---|---|---|---|
| 8,793,200 | B1 | 7/2014 | Chen et al. |
| 10,156,850 | B1* | 12/2018 | Ansari .............. B60W 30/0953 |
| 2003/0228035 | A1 | 12/2003 | Parunak et al. |
| 2013/0060456 | A1* | 3/2013 | Pourparhizkar ......... G08G 1/22 701/117 |
| 2014/0180569 | A1* | 6/2014 | Ueda .................... B62D 15/025 701/400 |
| 2017/0139423 | A1* | 5/2017 | El Ferik ............... G05D 1/0088 |
| 2017/0227972 | A1* | 8/2017 | Sabau .................... G05D 1/024 |
| 2018/0074505 | A1* | 3/2018 | Lv ..................... B60W 30/0956 |
| 2018/0167452 | A1 | 6/2018 | Yucelen et al. |
| 2018/0333855 | A1 | 11/2018 | Moses et al. |
| 2019/0069379 | A1 | 2/2019 | Kastee et al. |
| 2021/0004023 | A1* | 1/2021 | Wakayama ......... G01C 21/3453 |

FOREIGN PATENT DOCUMENTS

| | | |
|---|---|---|
| CN | 103971161 | 8/2014 |
| CN | 107088307 | 8/2017 |
| CN | 108260092 | 7/2018 |
| CN | 108594798 | 9/2018 |
| CN | 108873894 | 11/2018 |
| EP | 1548530 | 6/2005 |
| KR | 20100112742 | 10/2010 |
| KR | 20110064861 | 6/2011 |
| WO | 2017044785 | 3/2017 |

OTHER PUBLICATIONS

Ballerini et al., "Interaction Ruling Animal Collective Behavior Depends on Topological Rather Than Metric Distance: Evidence From a Field Study," Proceedings of the National Academy of Sciences U.S.A., vol. 105, No. 4, pp. 1232-1237, Jan. 29, 2008.
Berdahl et al., "Emergent Sensing of Complex Environments by Mobile Animal Groups," Science, vol. 339, No. 6119, pp. 574-576, Feb. 1, 2013.
Bialek et al., "Statistical Mechanics for Natural Flocks of Birds," Proceedings of the National Academy of Sciences U.S.A., vol. 109, No. 13, pp. 4786-4791, Mar. 27, 2012.
Buhl et al., "From Disorder to Order in Marching Locusts," Science, vol. 312, No. 5778, pp. 1402-1406, Jun. 2, 2006.
Cavagna et al., "Diffusion of Individual Birds in Starling Flocks," Proceedings of The Royal Society B, vol. 280, No. 1756, pp. 1-9, Apr. 7, 2013.
Cavagna et al., "Flocking and Turning: a New Model for Self-organized Collective Motion," arXiv: 1403.1202 [cond-mat.stat-mech]. Available Online at: https://arxiv.org/abs/1403.1202, 17 pages, Mar. 5, 2014.
Cavagna et al., "The Physics of Flocking: Correlation as a Compass From Experiments to Theory," Physics Reports 728, pp. 1-62, Jan. 18, 2018.
Chen, "Swarm Splitting and Multiple Targets Seeking in Multi-Agent Dynamic Systems," IEEE, Dec. 15-17, 2010.
Couzin et al., "Collective Memory and Spatial Sorting in Animal Groups," Journal of Theoretical Biology, vol. 218, No. 1, pp. 1-11, Sep. 7, 2002.
Devasia, "Faster Response in Bounded-Update-Rate, Discrete-Time Networks Using Delayed Self-Reinforcement," Jul. 24, 2019.
Devasia, "Accelerated Consensus for Multi-Agent Networks Through Delayed Self Reinforcement," May 9, 2019.
Devasia, "Rapid Information Transfer in Swarms Under Update-Rate-Bounds Using Delayed Self-Reinforcement," Aug. 8, 2019.
Devasia, "Rapid Information Transfer with Self Reinforcement," UW ME Dept., Jan. 3, 2018.
Devasia, "Faster Response Discrete-Time Networks Under Update-Rate Limits," ICC, India, Jan. 9-11, 2019.
Dutta, "How Birds Fly Together: The Dynamics of Flocking," Resonance, Jan. 6, 2011.
Fernandez-Juricic et al., "Where Does a Flock End from an Information Perspective? A Comparative Experiment With Live and Robotic Birds," Behavioral Ecology, vol. 22, No. 6, pp. 1304-1311, Aug. 30, 2011.
Gregoire et al., "Onset of Collective and Cohesive Motion," Physical Review Letters, vol. 92, No. 2, pp. 025702-1-025702-4, Jan. 15, 2004.
Halloy et al., "Social Integration of Robots into Groups of Cockroaches to Control Self-Organized Choices," Science, vol. 318, No. 5853, pp. 1155-1158, Nov. 16, 2007.
Hauert, "Ant-Based Swarming With Positionless Micro Air Vehicles for Communication Relay," Ecolepolytechnique, Dec. 2008.
Herbert-Read et al., "Inferring the Rules of Interaction of Shoaling Fish," Proceedings of the National Academy of Sciences U.S.A., vol. 108, No. 46, pp. 18720-18731, Nov. 15, 2011.
Herbert-Read et al., "Initiation and Spread of Escape Waves within Animal Groups," Royal Society Open Science, vol. 2, No. 4, 11 pages, Apr. 1, 2015.
Huth et al., "The Simulation of the Movement of Fish Schools," Journal of Theoretical Biology, vol. 156, No. 3, pp. 365-385, Jun. 1992.
Ioannou et al., "Predatory Fish Select for Coordinated Collective Motion in Virtual Prey," Science, vol. 337, No. 6099, pp. 1212-1215, Sep. 7, 2012.
Ioannou, "Swarm Intelligence in Fish? The Difficulty in Demonstrating Distributed and Self-organised Collective Intelligence in (Some) Animal Groups," Behovioural Processes, vol. 141, No. 2, pp. 141-151, Aug. 2017.
Kownacki et al., "Flocking Algorithm for Fixed-Wing Unmanned Aerial Vehicles," 2015.
Kownacki et al., "Fixed-Wing UAVs Flock Control Through Cohesion and Repulsion Behaviours Combined with a Leadership," International Journal of Advanced Robotic Systems, vol. 13, 10 pages, Jan. 1, 2016.
Krishnanand, "A Glowworm Swarm Optimization Based Multi-Robot System for Signal Source Localization," 2009.
Kyriakopoulos et al., "Leading Birds by their Beaks: the Response of Flocks to External Perturbations," New Journal of Physics, vol. 18, 15 pages, Jul. 20, 2016.
Mach, "Modeling Vortex Swarming in Daphnia," Society for Mathematical Biology, Aug. 19, 2006.
Makris et al., "Critical Population Density Triggers Rapid Formation of Vast Oceanic Fish Shoals," Science, vol. 323, No. 5922, pp. 1734-1737, Mar. 27, 2009.
Mateo et al., "Effect of Correlations in Swarms on Collective Response," Scientific Reports, vol. 7, No. 10388, 11 pages, Sep. 4, 2017.

(56) References Cited

OTHER PUBLICATIONS

Nagai et al., "Collective Motion of Self-Propelled Particles with Memory," Physical Review Letters, vol. 114, pp. 168001-1-168001-6, Apr. 24, 2015.

Tapabrata, "A Swarm Metaphor for Multiobjective Design Optimization," Engineering Optimization, vol. 34, pp. 141-153, 2002.

Ren, "Stable Information Transfer Network Facilitates the Emergence of Collective Behavior of Bird Flocks," Physical Review, 98, Nov. 2018.

Rubenstein et al., "Programmable Self-assembly in a Thousand-robot Swarm," Science, vol. 345, No. 6198, pp. 795-799, Aug. 15, 2014.

Sekunda, "Interplay Between Signaling Network Design and Swarm Dynamics," Network Science, 4, pp. 244-265, May 23, 2016.

Shang et al., "Influence of the No. of Topologically Interacting Neighbors on Swarm Dynamics," Scientific Reports, vol. 4, No. 4184, 2015, pp. 1-7, Feb. 25, 2014.

Storms et al., "Complex Patterns of Collective Escape in Starling Flocks Under Predation," Behavioral Ecology and Sociobiology, vol. 73, No. 10, pp. 1-10, Jan. 19, 2019.

Strandburg-Peshkin et al., "Shared Decision-Making Drives Collective Movement in Wild Baboons," Science, vol. 348, No. 6241, 5 pages, Jun. 19, 2015.

Tiwari et al., "Cohesive Velocity Transitions in Robotic Platoons Using Nesterov-Type Accelerated Delayed Self Reinforcement (A-DSR)," 2019 Sixth Indian Control Conference (ICC), Indian Institute of Technology Hyderabad, 6 pages, Dec. 19, 2019.

Tolba, "Taking Swarms to the Field: Constrained Spiral Flocking for Underwater Search," IEEE (ISCC), Jun. 30, 2016.

Tomaru, "Information Transfer in a Swarm of Soldier Crabs," Artif. Life Robotics 21, pp. 177-180, Mar. 10, 2016.

Van De Waal et al., "Potent Social Learning and Conformity Shape a Wild Primate's Foraging Decisions," Science, vol. 340, No. 6131, pp. 483-485, Apr. 26, 2013.

Vicsek et al., "Novel Type of Phase Transition in a System of Self-Driven Particles," Physical Review Letters, vol. 75, No. 6, pp. 1226-1229, Aug. 7, 1995.

Wang et al., "Quantifying and Tracing Information Cascades Swarms," PloS ONE, vol. 7, No. 7, pp. 1-7, Jul. 12, 2012.

Wang et al., "Collective Behaviors Through Social Interactions in Bird Flocks," IEEE, Aug. 8, 2019.

Yu, "Optimizing Multi-Agent Dynamics for Underwater Tactical Applications", Baylor University. Dept. of Electrical and Computer Engineering, 85 pages, May 12, 2011.

\* cited by examiner

METHOD FOR CONTROLLING AUTONOMOUS AGENTS USING SELF-REINFORCEMENT

CROSS-REFERENCES TO RELATED APPLICATIONS

This application claims the benefit of U.S. Provisional Application No. 62/781,483, filed Dec. 18, 2018, the entire contents of which are hereby incorporated by reference in its entirety for all purposes.

BACKGROUND

The advent of automated vehicles such as driverless trucks, and unmanned aerial vehicles, among others, has raised questions regarding control systems, steering, and safety management systems that will be necessary for successful integration of such automated vehicles into the transportation and logistics industries. One area of ongoing development is in the management of automated vehicles as platoons, in formation, or otherwise traveling with each other, whether that be on the road, in the air, and with or without the presence of manually operated vehicles containing human drivers. Existing control schemes rely on, e.g., identification of environmental cues, GPS, and collision avoidance systems that detect nearby vehicles and prevent imminent collision. However, many of these control systems result in slow response, or otherwise deficient vehicle behavior, especially when interacting with a mixture of machine and human piloted vehicles. For the above reasons, improvements in the control systems for vehicles that interact under real-world conditions are desired.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

According to various embodiments of the present disclosure, a system for controlling navigation of an automated vehicle in response to movement of adjacent automated vehicles can include an automated vehicle in formation with the adjacent automated vehicles, the automated vehicle having a sensing device able to detect movement of the adjacent automated vehicles. A controller can be connected with the automated vehicle or networked to interface with the automated vehicle in order to: determine an average movement of a subset of the adjacent automated vehicles, or "neighboring" automated vehicles, over a first period of time based on output of the sensing device. The system can then generate course correction data based on the average movement of the subset of adjacent automated vehicles over the first period of time. The system can additionally determine time-delayed movement data corresponding to a prior change in position of the automated vehicle over a second period of time preceding the first period of time, and augment the course correction based on the time-delayed movement data. The augmented course correction data can be used to instruct the automated vehicle to move in a way that improves convergence, enables faster response and thereby promotes movement of the automated vehicles in formation without requiring additional signal transfer.

According to various embodiments of the present disclosure, a method for controlling navigation of an automated agent in response to movement of adjacent automated agents can include receiving movement data indicative of an average movement of a subset of the adjacent automated agents neighboring the automated agent over a period of time. Course correction data can be generated according to neighbor-following methods based on the movement data. Additionally, time-delayed movement data can be determined corresponding to prior movement of the automated agent over a preceding period of time (i.e. at a time delay), and this time-delayed movement data can be processed to augment the course correction data based on the time-delayed movement data. The augmented course correction data can be used to instruct the automated vehicle to move in a way that improves convergence and thereby promotes movement of the automated vehicles in formation without requiring additional signal transfer.

According to various embodiments of the present disclosure, a system for controlling navigation of one or more automated agents can include an automated agent in formation with one or more adjacent automated agents, and a controller configured with instructions to determine an average movement of a subset of the adjacent automated agents (i.e., neighboring agents) over a first period of time. The system can generate course correction data based on the average movement of the one or more adjacent automated agents. In addition, the system can determine time-delayed movement data corresponding to prior movement of the automated agent over a second period of time preceding the first period of time, or time delayed movement data. The system can proceed to augment the course correction data based on the time-delayed movement data to generate augmented course correction data, and instruct the automated agent to move based on the augmented course correction data.

For a fuller understanding of the nature and advantages of the present invention, reference should be made to the ensuing detailed description and accompanying drawings.

DETAILED DESCRIPTION

Figure 1:
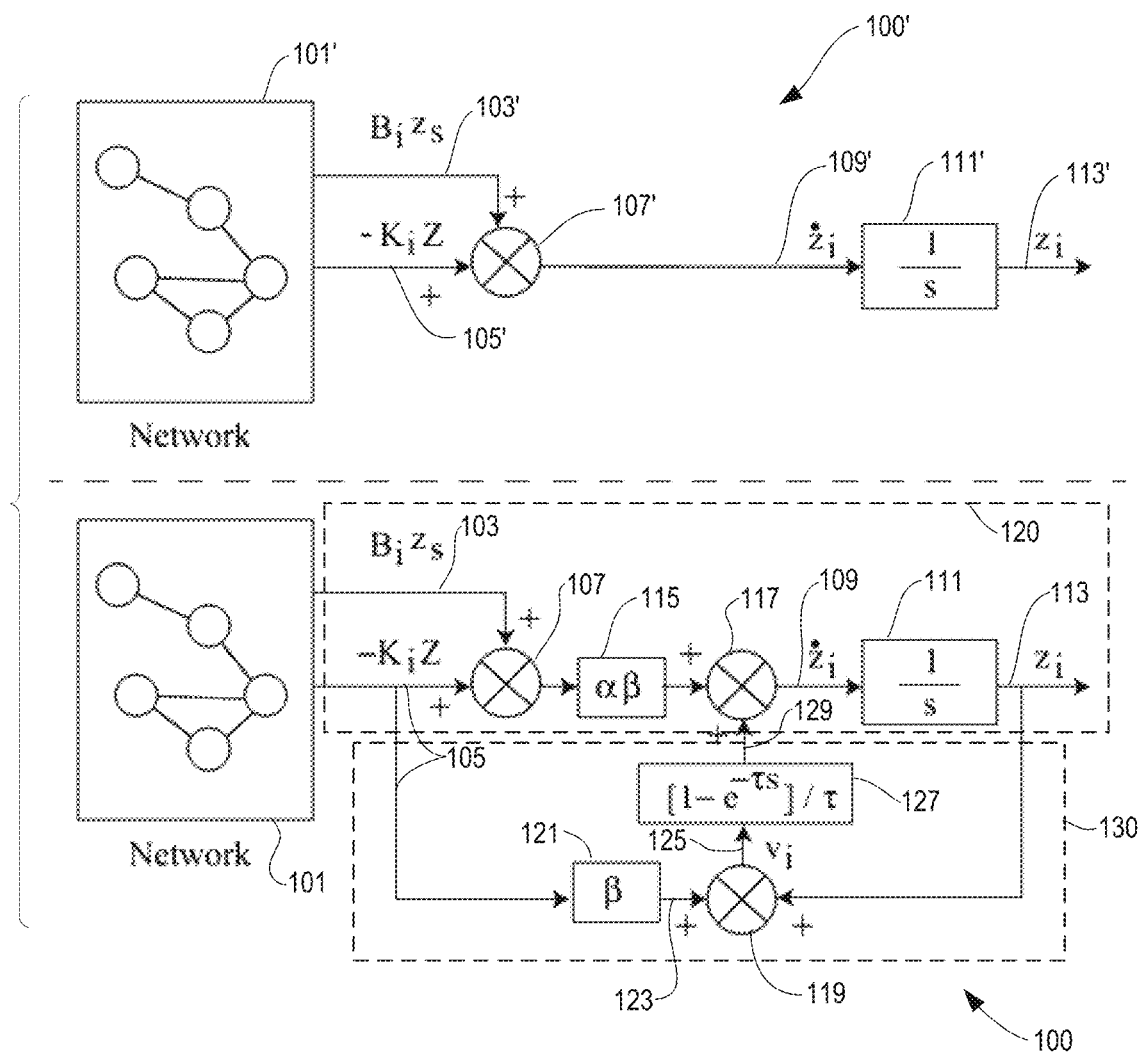
FIG. 1 is a simplified network diagram illustrating a control system for an agent, including a modified network system using delayed self-reinforcement, and a network system that does not apply delayed self-reinforcement.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

According to various embodiments disclosed herein, improved control systems for automated or semi-automated agents, such as automated vehicles (e.g., cars, trucks, and unmanned aerial vehicles), swarm robots, and other computer-controlled agents, are achieved in the context of agents traveling in formation, such as vehicles in a platoon or unmanned aerial vehicles in an aerial formation, by the application of alignment information between the agents in the formation in conjunction with delayed self-reinforcement. In summary, the control system of a vehicle in formation can use information about the trajectories and speed of other vehicles in formation that it can "sense," which can include multiple vehicles simultaneously, in order to generate an update to that vehicle's steering, acceleration, or breaking in order to follow the other vehicles and remain in formation. This information alone, however, is insufficient for vehicle to follow an appropriate path during rapid maneuvers, or for the formation to remain cohesive. In addition to causing the vehicle to align with its neighbors, the control system can use delayed self-reinforcement (DSR) to modulate how the vehicle changes speed and trajectory, resulting in improvements in the ability of each vehicle using delayed self-reinforcement to retain formation and to follow an appropriate path, even or especially during complex or rapid maneuvers, when compared with vehicles that do not utilize delayed self-reinforcement.

Aligning with neighbors has been used to model a range of information transfer in nature with applications in biology such as flocking and in physics such as flow of granular materials. For example, studies of the propagation of turns in starling flocks have shown that the information transfer can be fast compared to reorganization of the formation. The speed of information transfer across the group can impact the cohesiveness of the response to external stimuli. Such increases in the information-transfer rate can be achieved by increasing the alignment strength, i.e., by scaling up the individual update that is based on averaged-information from neighbors. Nevertheless, such an increase in the alignment strength generally requires an increase in the information-update rate, which is limited by each individual's ability to sense and process external stimuli. A limit exists to the maximum rate of information transfer possible with standard models with a fixed update rate. Moreover, current models of the neighbor-averaged information transfer do not predict the superfluid-like information transfer observed in biological flocking.

Superfluid-like information transfer tends to have a linear propagation of the information with respect to time as opposed to a square root-type dependence on time with standard diffusion-type models. More importantly, superfluid-like information transfer leads to undamped propagation of the radial acceleration across the flock, which is important to achieve equal-radius (parallel) trajectories for cohesive maneuvers.

As disclosed herein, neighbor-alignment-based models can be modified to capture the superfluid-like information transfer by the application of a feedback mechanism using delayed self-reinforcement in conjunction with appropriately tuned gain to modify the way in which the vehicle course corrects while traveling in formation. The proposed approach uses delayed versions of the previous update to self-reinforce the current update. Since delays are available in neural circuits, the delayed self-reinforcement method might be potential mechanism to explain the superfluid-like observations found in nature. Moreover, delayed self-reinforcement can increase the information-transfer rate without requiring an increased update rate, and in this sense it can be advantageous compared to the current models, both the standard diffusion-type models; and the superfluid-like higher-order models. Moreover, the delayed self-reinforcement approach can be used to improve communication of engineered swarming agents such as platooning automated vehicles, unmanned aerial vehicles, and swarm robots.

In particular, embodiments disclosed herein using a delayed self-reinforcement approach can improve the cohesion of formations of agents by causing a faster convergence of the agents to a new consensus value (e.g. velocities of each agent in formation). Faster convergence implies a smaller overall settling time of the network response of a formation of vehicles during transitions between consensus values, e.g., during rapid maneuvers of the formation. The settling time is the time needed for all agents to reach a specified percentage of a final state $Z=Z_f$ when transitioning from an initial state $Z=Z_i$, where all agents have the same initial value. Faster settling reduces the potential delays between the responses of the agents, thus promoting cohesion. For example, the network's response can be sped up when the network dynamics have the following form:

$$\dot{Z}(t)' = U(t) = -\gamma \tilde{K} Z(t) + \gamma \hat{B}_{z_s}(t) \qquad \text{(Equation 1)}$$

by scaling the gain 'γ' of the network interactions, where $K=\lambda \hat{K}$ is the graph Laplacian, and $z_s$ is the desired response. The Laplacian K is the matrix given by the divergence of the agents in Euclidean space, and $B=\lambda \hat{B}$ is the matrix given by the following:

$$B(i) = 1/|N_i| \quad \text{if } s \in N_i \qquad \text{(Equation 2)}$$
$$= 0 \quad \text{otherwise}$$

However, in general, increasing the overall speed of the network requires larger inputs U, therefore, maximum input constraints on the actuators driving the agents can lead to restrictions on the maximum response speed increase, which in turn limits the available cohesion. B indicates whether the agent has access to the source $z_s$ or not.

Turning now to the figures, FIG. 1 is a simplified network diagram illustrating a control system for an agent, including a modified network system 100 using delayed self-reinforcement, and a network system 100' that does not apply delayed self-reinforcement. Network information $K_i Z$ and $B_i Z_s$ represent swarm information available to each agent in the network, respectively, where $K_i$ and $B_i$ are the $i^{th}$ rows of matrices K and B, respectively.

In the unmodified network system 100', a network 101' provides self and neighbor information for the agent including source state information 103' and neighbor state information 105', each modified by respective gains and combined by an operator 107' to obtain a derivative of the state $\dot{Z}_i$ 109', which can be integrated through 111' to obtain the state $Z_i$ 113', according to equation 1 given above.

In the modified network system 100, according to various embodiments of the present disclosure, a delayed self-reinforcement algorithm 130 processes the system output to generate additional system inputs that act as a filter to improve system response, when combined into an algorithm 120 resembling that of the unmodified network system 100'. The network 101 provides self and neighbor information for the agent including source state information 103 and neighbor state information 105, each modified by respective gains and combined by operator 107 in the same manner discussed above with respect to the unmodified network system 100'. However, the output of the operator 107 can be further modified 115 based on gain parameters α and β, for example, according to the equations:

$$T_s = \frac{4}{\alpha} \quad \text{(Equation 3)}$$

$$\beta K \dot{Z}(t) = -\alpha\beta KZ(t) + \alpha\beta K 1_{nZs} \quad \text{(Equation 4)}$$

whereby the ideal cohesive dynamics equation can be rewritten as:

$$\dot{Z}(t) = \alpha\beta KZ(t) + \alpha\beta B_{z_s}(t) + [I - \beta K]\dot{Z}(t). \quad \text{(Equation 5)}$$

The modified output 115 can be combined with delayed derivative information 129 to generate a delayed self-reinforcement modified derivative of the state $\dot{Z}_i$ 109. The modified derivative of the state 109 can be integrated through 111 to output the delayed self-reinforcement modified state $Z_i$ 113.

The modified state $Z_i$ 113 is processed to iteratively generate delayed derivative information 129. The divergence information 105 is processed based on gain β 121, and the resulting output 123 is combined with the output modified state 113 based on function 119 to generate an additional input term $V_i$ 125. $K_i Z$ represents information obtained (such as average values) from neighbors in the network, and when augmented by its own information leads to $V_i$, the known value from the network used in the control update. $V_i$ can be computed without modifying the network structure K according to the following equation:

$$v_i(\bullet) = z_i(\bullet) - \beta K_i Z(\bullet) \quad \text{(Equation 6)}$$

The additional input term $V_i$ 125 can be modified by function 127 to result in an additional delay derivative information 129, which modifies the derivative of the state 109 according to the following equation:

$$\dot{z}_i(s) = -\alpha\beta K_i Z(s) + \alpha\beta B_{iZs}(s) + \left(\frac{1 - e^{-\tau s}}{\tau}\right) v_i(s). \quad \text{(Equation 7)}$$

For a system at rest, delayed derivative information 129 is trivial or zero.

Delayed self-reinforcement as described above enables cohesive tracking by an agent in a system including two agents (i.e., a follower and a leader), or can be extended to systems including more than two, potentially a large number of agents (i.e., a leader and multiple followers, or multiple layers of followers that are not necessarily directly adjacent the leader). In addition, the delayed self-reinforcement approach can be extended to enable cohesive tracking in two or three dimensions or when the agents have higher order dynamics, and the delayed self-reinforcement update (i.e., the additional input term $V_i$ 125) can be filtered to reduce the effect of noise. For example, a low pass filter can be applied to the coefficient of $V_i(s)$ in equation 7, above.

Figure 2:
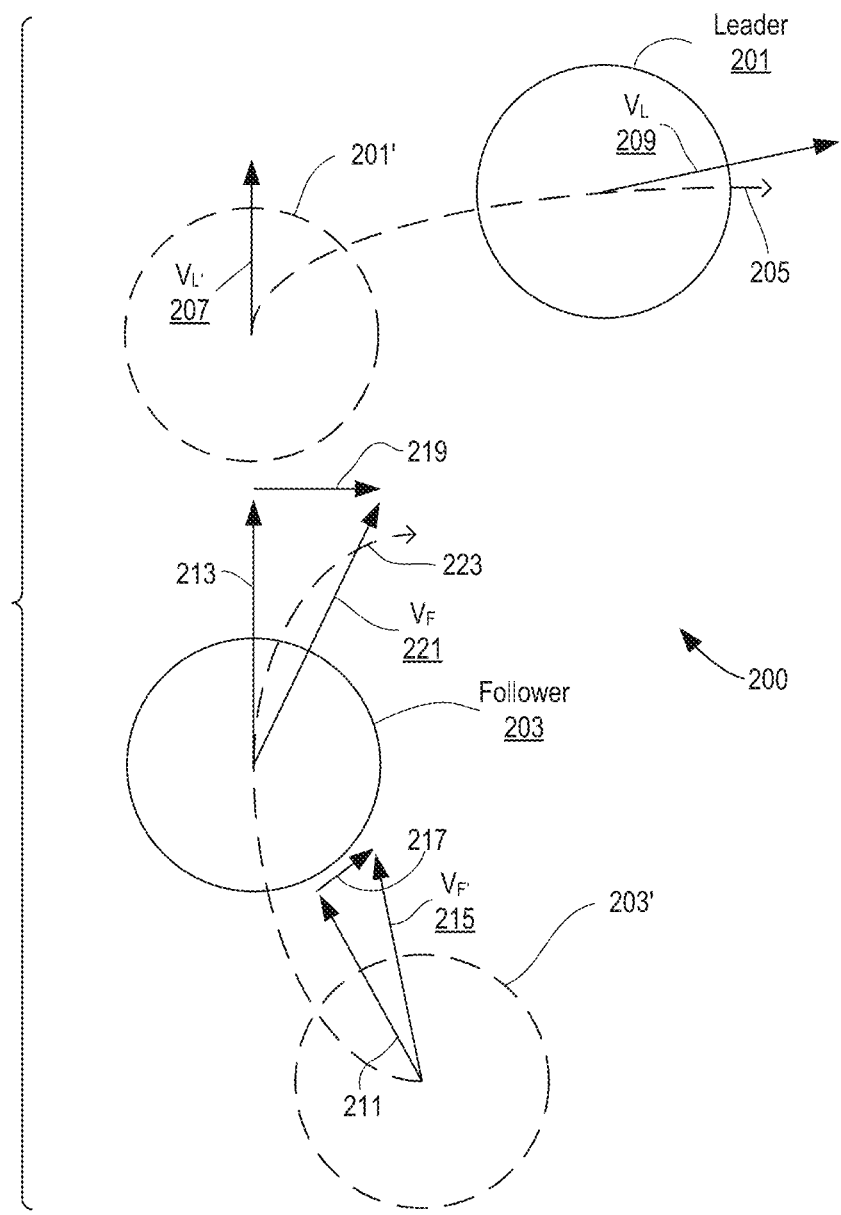
FIG. 2 is a simplified schematic illustrating a two agent system 200, including a leader 201 and a follower 203 that utilizes delayed self-reinforcement to improve tracking of the leader.

FIG. 2 is a simplified schematic illustrating a two agent system 200, including a leader 201 and a follower 203 that utilizes delayed self-reinforcement to improve tracking of the leader. According to various embodiments, the leader 201 can have an instantaneous velocity 209 as it moves along a path 205 from an initial position 201' at a previous point in time, where the leader had a previous velocity 207. The follower 203 be subjected to a change in its velocity based on information known about the position and/or velocity of the leader 201 at the previous point in time, i.e. when the leader 201 was at initial position 201' with initial velocity 207. Thus, based only on the leader's previous position 201' and previous velocity 207, a control system of the follower 203 can implement an initial course modification 213. However, the initial course modification 213 does not perfectly track the movement of the leader, and may be particularly inaccurate when subjected to an abrupt change in direction, e.g., path 205. Such inaccuracies contribute to slowing the convergence of the follower's path 223 with the leader's path 205.

In the preceding time step, the control system of the follower 203 at initial position 203' calculates an initial course correction 211 at time (t–2) based on movement of the leader 201, and modifies the course correction 217, i.e. Δ(t–2) based on the delayed self-reinforcement approach described above, resulting in a previous modified follower velocity 215. In the current time step, the control system of the follower 203 again calculates an initial course modification 213 based on the change in direction of the leader 201, and calculates an additional course correction 219 based on the delayed self-reinforcement approach to generate a modified follower velocity 221, i.e., based on gains α and β applied to the deviation Δ and the time-delayed deviation Δ(t–2).

Figure 3:
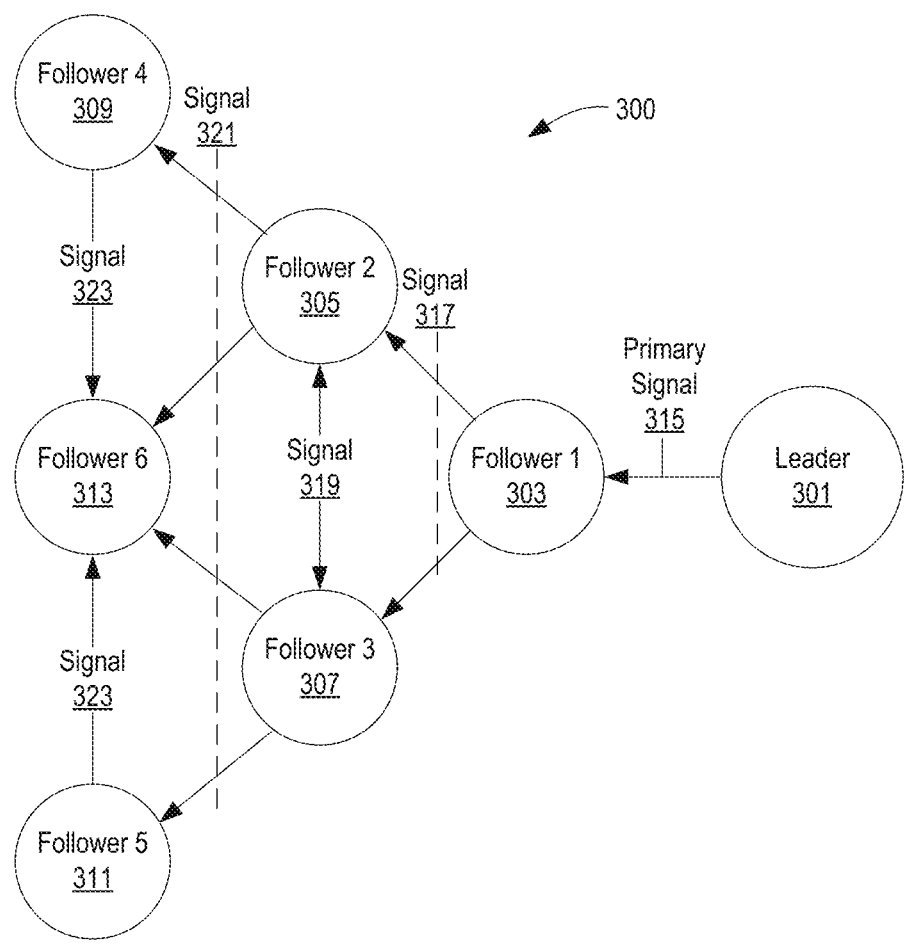
FIG. 3 is an illustration of a first network example illustrating information propagation in a system of autonomous agents in formation, applicable to use cases where multiple follower agents are in formation together.

FIG. 3 is an illustration of a first network example 300 illustrating information propagation in a system of autonomous agents in formation, applicable to use cases where multiple follower agents are in formation together, or following a leader agent 301. According to various embodiments, information about the movement of the leader 301 can propagate into the system by one or more follower agents that are within a sensing range, or that are assigned to sense, movement by the leader 301.

Herein, follower agents are referred to as receiving signals indicative of movement data of other autonomous agents. Typically, this means the receipt of movement data by a controller associated with the respective autonomous agent, where the autonomous agent can refer to a physical vehicle that can interpret instructions from the controller in order to navigate through physical space. Autonomous agents can be controlled via an onboard controller, which can perform processing functions onboard the autonomous agent, or alternatively via an automated remote controller networked with a local controller to actuate the autonomous agent. In some embodiments, individual autonomous agents also include sensing devices capable of directly measuring movement of adjacent autonomous agents. Alternatively, in some embodiments, movement information of adjacent autonomous agents can be measured independently and provided to the controller(s); or movement information of each autonomous agent can be measured by the moving autonomous agent, and can be transmitted to other autonomous agents in the system. In some embodiments, autonomous agents can be virtual agents operating in simulation.

In the instant case, the first follower agent 303 receives a primary signal 315 indicative of movement of the leader agent 301, and will move in formation with the leader agent. This use case describes, for example, the automated agents being assigned to follow a particular agent or vehicle, such as a directly or indirectly controlled vehicle, a piloted vehicle, or comparable target. According to some other embodiments, the first follower agent (303) can instead act as a leader, and the primary signal 315 represents instructions to follow a particular path, or to follow a virtual leader, i.e., to follow a path defined by movement of a target location using the delayed self-reinforcement algorithms defined above.

Movement of the first follower 303 can be represented as a first layer of signals 317 between the follower agents in formation, whereby each subsequent follower that is within range to track or that is assigned to track the first follower receives and acts on the first layer of signals. In the example, a second layer of follower agents includes the second follower agent 305 and third follower agent 307. Each of the second and third follower agents 305, 307 identifies as "neighboring agents" the first follower 303, and adjacent follower agents 307, 305—i.e., the third follower agent being neighbors with the second, and vice versa, when the formation is moving to the right on page. Thus, each one of the second follower agent 305 and third follower agent 307 can "see" each other and the first follower agent 303. In system terms, each of the second follower agent 305 and third follower agent 307 receive signals including the first layer of signals 317 that indicate movement of the first follower agent 303, and a second signal 319 indicating movement of the neighboring follower agents. These first and second signals 317, 319 are used to generate average movement data for driving course corrections of the second follower agent 305 and third follower agent 307. The inclusion of movement data of the first follower agent 303 in the averaged movement data can drive forward movement, for example, whereas the inclusion of movement data of the immediately adjacent second or third follower agents 305, 307 can drive course adjustment preventing collision between the autonomous agents. The signals can be obtained by each respective follower agent sensing movement of its respective neighbors via an onboard sensing device, by a centralized and networked control system providing movement data for the follower agents, by a control system modeling movement data and providing modeled movement data to the follower agents, or by a combination of the above.

Movement of each one of the second follower agent 305 and third follower agent 307 similarly generates movement data that is propagated to an additional layer of follower agents via a second layer of signals 321. Movement data corresponding to each one of the second follower 305 and third follower 307 propagates to follower agents in the next layer, e.g., a fourth follower 309, fifth follower 311, and sixth follower 313. Each respective follower "sees" neighboring autonomous agents, including those immediately adjacent the respective agent in formation and those forward of the agent. For example, the fourth follower agent 309 receives signal 321 that is indicative of movement of the second follower 305, which is ahead of and immediately adjacent the fourth follower agent; but the fourth follower agent does not receive movement information for the third follower 307, which is not immediately adjacent. In contrast, the sixth follower 313 can receive signals 321 from both the second follower 305 and the third follower 307, which are both ahead of and immediately adjacent the sixth follower. In addition, the sixth follower agent 313 may receive signals 323 from the immediately adjacent fourth follower 309 and fifth follower 311. Thus, averaged movement data obtained for driving course corrections of the sixth follower agent 313 can include movement data for a large number of immediately adjacent autonomous agents, thus constraining movement of the sixth follower agent and driving alignment with the formation.

Virtual source information to the leader or to a follower can inform or override the behavior of autonomous agents in a formation, platoon, or swarm, such as but not limited to: autonomous collision avoidance, manual course corrections, or instructions to modify the positioning of the formation. For example, according to some embodiments, autonomous agents in formation (e.g., a platoon of vehicles) may be configured with sensors and on-board computing systems that scan for obstacles and initiate course corrections to avoid collisions. The autonomous agent making an unexpected course correction can be treated like a leader by autonomous agents downstream. Thus, unexpected course corrections by a follower agent in a formation of autonomous agents will result in a cohesive response by the downstream followers of the follower agent making the unexpected course correction. Alternatively, according to some embodiments, autonomous agents can receive information both upstream and downstream by way of an undirected connection, whereby an autonomous agent upstream can be affected by a neighboring agent downstream, whether by sensing changes in movement of the downstream agent, or by receiving information from or about the downstream agent. For example, the downstream autonomous agent or follower vehicle in a formation or platoon may communicate movement information upstream, which can cause the upstream autonomous agent to modify its movement in order to improve cohesion of the formation or platoon given an unexpected maneuver of the downstream autonomous agent. According to some embodiments, the downstream autonomous agent may communicate position information routinely to the upstream autonomous agent, or the downstream autonomous agent may communicate position information to the upstream autonomous agent under specific conditions, e.g. in response to collision avoidance or another unexpected maneuver.

If the unexpected course correction results in discontinuity of the original formation, the formation can re-synchronize in several ways. For example, according to some embodiments, after an obstacle or a collision has been avoided by an autonomous agent in a formation, the neighbor-based methods for formation control may cause the followers to re-synchronize. Provided the downstream autonomous agents remain within sensing range or retain a data connection with upstream autonomous agents or with a leader, the neighbor-based methods for formation control will tend to cause re-synchronization of the formation even when the formation has been distorted by the course correction. According to some alternative embodiments, the movement of the downstream autonomous agents can be corrected by instructing a newly designated leader in a subset of the autonomous agents to rejoin the formation. The instructions can take the form of providing a path or instructing the newly designated leader to follow a virtual leader as discussed above until the upstream autonomous agents are within sensing range or again connected to exchange data. Similar responses for maintaining formation and for reestablishing formation can be implemented when a follower agent is otherwise diverted from following the neighbor-based methods described herein, e.g., when a follower agent is instructed to perform other maneuvers not related to collision avoidance.

As discussed above, course correction utilizing only neighbor-averaged movement information can be deficient for systems of autonomous agents moving in formation, particularly during rapid maneuvers. Thus, course corrections applied to each autonomous agent in formation are augmented by the addition of a delayed self-reinforcement term, as described above. The implementation of delayed self-reinforcement improves the cohesiveness of movement of a formation without requiring increased response speed between autonomous agents. This effect can be particularly advantageous with reference to large formations, where each autonomous agent may be required to course-correct based on the movement data of a potentially large number of adjacent automated agents.

It will be understood that a formation of autonomous agents may have many different configurations, and the example configuration is shown for purposes of illustrating signal propagation among autonomous agents in an expanding formation. The principles described herein can apply to autonomous agent formations having many other compositions and formation shapes.

Figure 4:
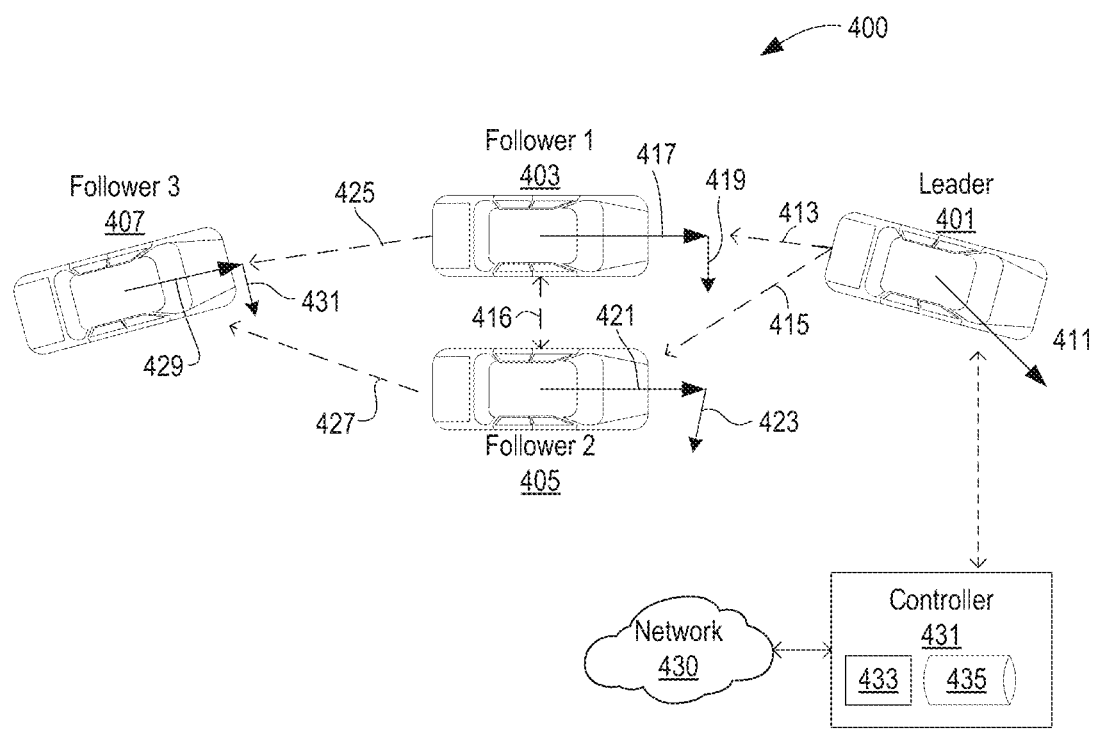
FIG. 4 is a schematic illustration of the application of delayed self-reinforcement to a course correction algorithm for an example system including driverless vehicles, in accordance with various embodiments of the present disclosure.

FIG. 4 is a schematic illustration of the application of delayed self-reinforcement to a course correction algorithm for an example system 400 for controlling autonomous agents including driverless vehicles, in accordance with various embodiments of the present disclosure. The system 400 includes a series of autonomous vehicles including a leader 401 that is moving forward and turning with an instantaneous velocity 411, and further includes a series of autonomous vehicles following the leader, including a first following vehicle 403, a second following vehicle 405, and the third following vehicle 407. The additional autonomous vehicles following the leader 401 can be convoyed behind the leader in the same lane (e.g. the first follower 403 and the third follower 407), or can be offset in formation with the leader 401 and any other autonomous vehicles (e.g. the second follower 405, represented traveling in parallel or in a separate lane).

Each one of the autonomous vehicles, e.g. the first follower 403, the second follower 405, or the third follower 407, can include onboard control systems including processors and memory containing the instructions configured for implementing course correction. Alternatively, a centralized controller 431 can communicate with one or more of the following autonomous vehicles in order to provide course corrections, and/or provide instructions for controlling movement of the leader 401. A controller 431 can include one or more processors 433 and a memory device 435 containing instructions configured to implement course corrections and/or to provide direct or indirect movement instructions to autonomous or semiautonomous vehicles. According to some embodiments, the controller 431 and any other controllers, e.g. individual controllers controlling the following vehicles, can communicate via a network 430.

According to various embodiments, system 400 can operate in a similar manner to system 300 described above, whereby information relating to the movement of the leader 401 (e.g. the velocity 411 and movement from a previous location) can be provided to one or more immediately adjacent following vehicles (e.g. following vehicle 403 and following vehicle 405) in the form of signals 413 and 415. Immediately adjacent autonomous vehicles, e.g. the first follower 403 and second follower 405 can also receive signals indicative of the position of each other or any other neighboring autonomous vehicles traveling in parallel, expressed as signal 415. An initial course correction 417 for the first follower 403 can be calculated as described above according to FIG. 1, based on averaged movement information of the leader 401 (signal 413) and the neighboring second following vehicle 405 (signal 416) with particular reference to dynamics algorithm 120 prior to augmentation with the delayed self-reinforcement algorithm 130, which is also illustrated schematically in FIG. 2, above. And augmentation to the course correction 419 can be applied based on previous movement information of the first follower 403 at a preceding time step according to the delayed self-reinforcement algorithm 130, resulting in an augmented course correction for the first follower 403 that more rapidly converges with a path of the leader 401 than the initial course correction. Similarly, the second follower 405 can receive signals 415, 416 that are indicative of movement by the leader 401 and the first following vehicle 403, and implement an initial course correction 421 with a subsequent augmentation 423 based on delayed self-reinforcement based on previous movement information of the second follower 405.

The control system 400 described above can improve platooning behavior of parallel autonomous vehicles in the context of autonomous vehicles by increasing the apparent rate of information transfer between autonomous vehicles based on their previous movements over time. In addition, the same methods can be applied to improve tracking by subsequent following vehicles, e.g. third following vehicle 407. The third following vehicle 407 can receive signals 425, 427 indicative of movement information of the first following vehicle 403 and the second following vehicle 405. Based on the movement information, a controller of the third following vehicle 407 can implement an initial course correction 429 based on averaged movement information of the neighboring autonomous vehicles, following vehicle 403 and following vehicle 405. In addition, the controller can implement an augmentation 431 of the initial course correction 429 by applying the delayed self-reinforcement algorithm described above to previous movement information of the third following vehicle 407.

The principles described above can also be applied to the three-dimensional context, for example, with unmanned aerial vehicles, submersible vehicles, swarm robotics, or other related autonomous and semi-autonomous vehicles. The calculation of an initial course correction, and augmentation of the initial course correction based on delayed self-reinforcement, applying the same manner with respect to both two-dimensional and three-dimensional movement.

Figure 5:
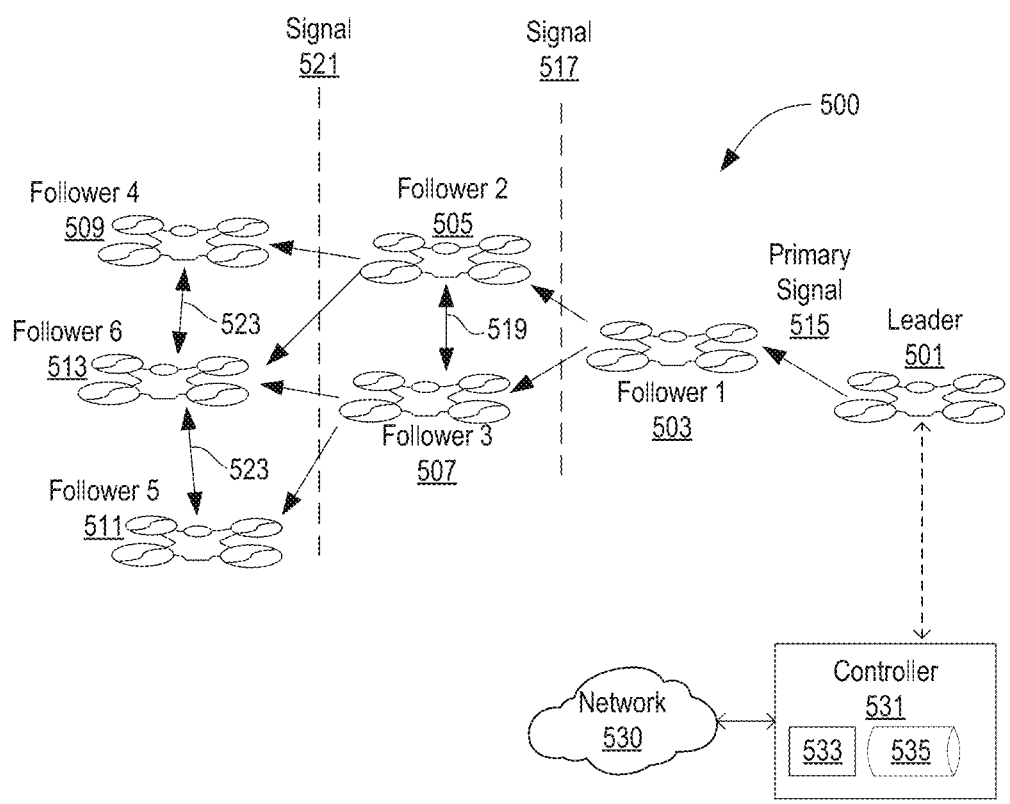
FIG. 5 is a schematic illustration of the application of delayed self-reinforcement to a course correction algorithm for an example system including unmanned aerial vehicles, in accordance with various embodiments of the present disclosure.

FIG. 5 is a schematic illustration of the application of delayed self-reinforcement to a course correction algorithm for an example system 500 including unmanned aerial vehicles, in accordance with various embodiments of the present disclosure. According to various embodiments, a leading agent 501 can navigate based on instructions provided by, e.g., controller 531, which includes at least one processor 533 and a memory device 535 including executable instructions configured at least to pilot the leading agent 501. According to some embodiments, controller 531, or alternatively separate controllers, can be networked 530 to control any additional autonomous agents, e.g. the following autonomous agents described below.

According to at least one embodiment, movement of the leading agent 501 can be received by, or processed by the controller of the first following agent 503, represented as primary signal 515. Any suitable number of following agents can be positioned immediately adjacent the leader 501 in formation, and more than one following agent may receive a primary signal 515 based on movement of the leader 501. Movement of the first following agent 503 is determined by a combination of an initial course correction based on averaged movement of the neighboring autonomous agents (e.g. leader 501 as shown) and any neighboring autonomous agents in parallel, which is augmented based on delayed self-reinforcement applied according to the methods described above.

Movement of the first following agent 503 can be sensed by or communicated to subsequent following agents, expressed as second signal 517. For example the second following agent 505 and the third following agent 507 can receive movement information based on averaged movement of the first following agent 503 as the second signal 517. The second following agent 505 and the third following agent 507, being neighboring autonomous agents, can each receive an additional signal 519 indicative of movement information of each other. According to some embodiments, movement information can be determined by a controller associated with each respective following agent based on movements detected by sensors associated with each respective autonomous agent, or alternatively, movement information can be stored by each autonomous agent and communicated as data to the neighboring following agents in formation. The second following agent 505 and the third following agent 507 can each implement course corrections including initial course corrections based on averaged movement of their respective neighboring autonomous agents, augmented based on delayed self-reinforcement using previous movement information of each respective autonomous agent, applied according to the methods described above.

One advantage of the use of delayed self-reinforcement to improve the convergence of following agent behavior in a formation is that the formation can be expanded without requiring concomitant increases in the speed with which signals are processed for each agent. Accordingly, the formation can be expanded to include a potentially large number of following agents. According to various embodiments, for example, an additional layer of signals 521 representing movement information of the second following agent 505 and the third following agent 507 can be received or sensed and determined by controllers associated with a fourth following agent 509, fifth following agent 511, and sixth following agent 513. Each of the additional following agents (or controllers thereof) in this third layer of following agents can also communicate or sense movement information of each other, e.g. signals 523. Averaged movement information of the neighboring autonomous agents for each respective following agent can be used to implement an initial course correction as described above, augmented based on delayed self-reinforcement to generate an augmented course correction that causes the autonomous agents in formation to remain in formation, and to more accurately track maneuvers of the formation as a whole with more rapid convergence than exhibited based on the initial course correction alone.

Figure 6:
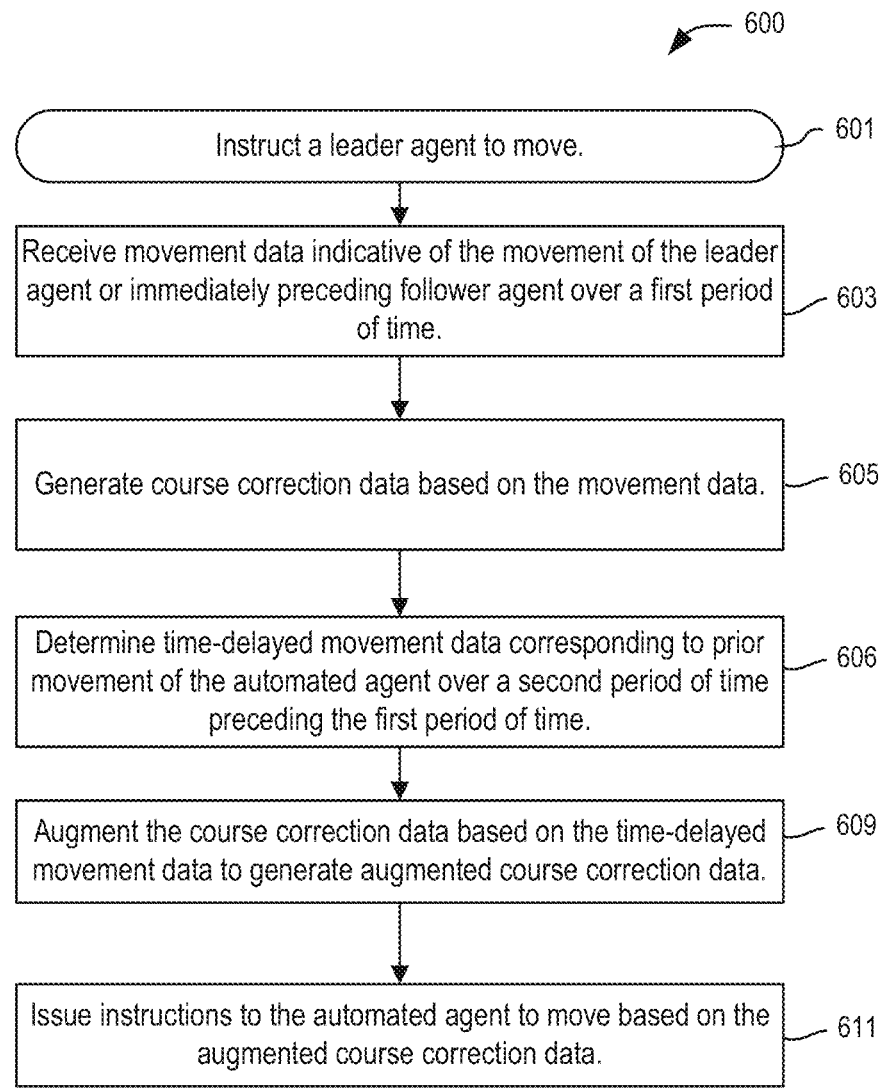
FIG. 6 is a process flow chart illustrating a method of controlling an automated agent (i.e., a follower agent) in a simplified two-agent system including a leader agent and the follower agent, in accordance with various embodiments of the present disclosure.

FIG. 6 is a process flow chart 600 illustrating a method of controlling an automated agent (i.e., a follower agent) in a simplified two-agent system including a leader agent and the follower agent, in accordance with various embodiments of the present disclosure. Aspects of process 600 can be carried out by any suitable control system for an automated agent such as, but not limited to, systems 100, 200, 300, 400, or 500, as described above. The control system for the follower agent can be onboard the follower agent, or can be a networked control system that receives information corresponding to the environment of the follower agent.

In a first step, the system can instruct a leader agent to move. (Act 601). The leader agent can be, for example, an autonomous vehicle, an unmanned aerial vehicle, or any other suitable agent or vehicle. The leader agent can be under direct or indirect control. For example, the leader agent may be manually controlled by way of a remote control by a user, can be manually piloted, or may be indirectly controlled by the system (e.g., point-to-point, by waypoint, or other suitable method). In some embodiments, the leader agent can provide a signal or movement data to the system to enable tracking of the movement of the leader agent over time.

One or more autonomous agents can follow a leader agent in formation, the simplest of which is a simple platoon in which a follower agent tracks the movement of a leader agent. According to some embodiments, multiple follower agents can be positioned in series, each respective follower agent treating the preceding follower agent as a leader agent. In some embodiments, each follower agent can include an onboard sensing device for detecting movement of the leader agent.

The system can receive movement data indicative of the movement of the leader agent or immediately preceding follower agent, with respect to the automated agent over a first period of time. (Act 603). The movement data is reflected above with reference to the control systems diagram 100 of FIG. 1, with particular reference to dynamics algorithm 120 prior to augmentation with the delayed self-reinforcement algorithm 130, and is illustrated schematically in FIG. 2, above. The movement data is indicative of the change in position and/or velocity of the leader agent. The system can proceed to generate course correction data for the autonomous agent following the leader agent (or each subsequent follower agent in a platoon) based on the movement data, the course correction data corresponding to a direction of movement directed to obtain a state where the autonomous agent moves to converge with the path of the leader agent. (Act 605).

Next, the system can determine time-delayed movement data corresponding to prior movement of the automated agent over a second period of time preceding the first period of time, where the second period of time is a predetermined time delay. (Act 606). The length of the time delay can be selected to modify how the system converges, with typical time delays on the order of 1 to 100 ms for applications such as robotics and autonomous vehicles.

The system can then augment the course correction data based on the time-delayed movement data to generate augmented course correction data, where the augmented course correction data utilizes historical information about the movement of the autonomous agent to moderate how the agent responds to movements of the leader agent. (Act 609). This augmentation step is reflected above with reference to the control system diagram 100 of FIG. 1, with particular reference to the delayed self-reinforcement algorithm 130. Following determination of the augmented course correction data, the system can proceed to issue instructions to the automated agent to move based on the augmented course correction data. (Act 611).

Figure 7:
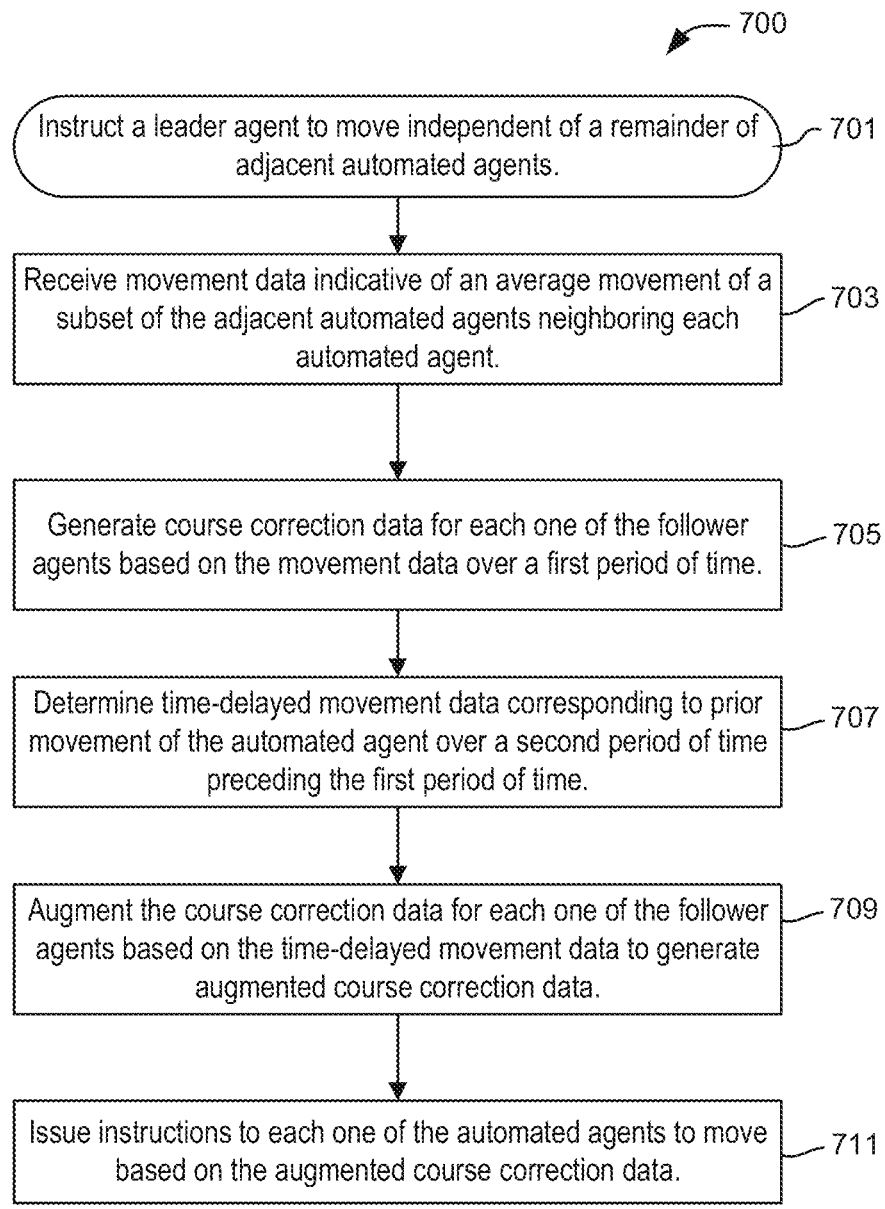
FIG. 7 is a process flow chart 700 illustrating a method of controlling an automated agent (i.e., a follower agent) in a simplified multi-agent system including a leader agent and multiple other follower agents, in accordance with various embodiments of the present disclosure.

Aspects of the above process can be expanded to apply to complex, higher-order systems in which multiple and potentially many automated agents are arranged in formation to follow a leader agent. For example, FIG. 7 is a process flow chart 700 illustrating a method of controlling an automated agent (i.e., a follower agent) in a simplified multi-agent system including a leader agent and multiple other follower agents, in accordance with various embodiments of the present disclosure. Aspects of process 700 can be carried out by any suitable control system for an automated agent such as, but not limited to, systems 100, 200, 300, 400, or 500, as described above. The control system for each follower agent can be onboard the follower agent, or can be a networked control system that receives information corresponding to the environment of each respective follower agent.

In a first step, the system can instruct a leader agent to move independent of a remainder of the adjacent automated agents. (Act 701). The leader agent can be, for example, an autonomous vehicle leading a platoon of other autonomous vehicles, an unmanned aerial vehicle leading a formation of unmanned aerial vehicles, or any other suitable agent or vehicle configured to move in conjunction with a group of autonomous agents. The leader agent can be under direct or indirect control. For example, the leader agent may be manually controlled by way of a remote control by a user, can be manually piloted, or may be indirectly controlled by the system (e.g., point-to-point, by waypoint, or other suitable method).

Multiple autonomous agents may be following the leader agent in a formation, in which some subset of the follower agents can be positioned to detect movement of the leader agent, and some subset of the follower agents can be positioned to detect movement of only other follower agents disposed between the respective follower agents and the leader agent. In any event, for each follower agent, the system can receive movement data indicative of an average movement of a subset of the adjacent automated agents neighboring the automated agent, with respect to the automated agent over a first period of time. (Act 703). The averaged movement data is reflected above with reference to the control systems diagram 100 of FIG. 1, with particular reference to dynamics algorithm 120 prior to augmentation with the delayed self-reinforcement algorithm 130. The averaged movement data is indicative of the average change in position of the neighboring autonomous agents over a period of time, i.e. the time immediately preceding measurement. The system can proceed to generate course correction data for each one of the follower agents based on the movement data, with the course correction data corresponding to a direction of movement directed to obtain a state where the autonomous agent moves according to the average movement of the adjacent group. (Act 705).

Next, for each one of the follower agents, the system can determine time-delayed movement data corresponding to prior movement of the automated agent over a second period of time preceding the first period of time, where the second period of time is a predetermined time delay prior to the immediately preceding time period during which movement of the neighboring autonomous agents was determined. (Act 707).

The system can then augment the course correction data for each one of the follower agents based on the time-delayed movement data to generate augmented course correction data, where the augmented course correction data utilizes historical information about the movement of the group of autonomous agents to moderate how the agents respond to movements of their neighboring autonomous agents. (Act 709). This augmentation step is reflected above with reference to the control system diagram 100 of FIG. 1, with particular reference to the delayed self-reinforcement algorithm 130. Following determination of the augmented course correction data, the system can proceed to issue instructions to each one of the automated agents to move based on the augmented course correction data. (Act 711).

According to some embodiments, the control system is distributed among local, and in some cases onboard, controllers associated with each individual automated agent; and in such embodiments, the automated agents can process sensed environmental information in order to determine individual correction data according to the methods described above.

The processes 600, 700 (or any other processes described herein, or variations, and/or combinations thereof) may be automated and performed mechanically under the control of one or more computer systems configured with executable instructions and implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

According to some embodiments, determination of time-delayed movement data can include obtaining previously applied course correction data, particularly the augmentation to previously applied course correction data obtained from previous course correction cycles. According to some other embodiments, the time delayed movement data can include averaged movement data indicative of the movements of the neighboring automated agents obtained from previous course correction cycles. In addition, the definition of neighboring automated agents from among the adjacent automated agents in a platoon, flock, or formation, can vary depending on the sophistication of the sensing mechanisms and the desired degree of coherence and mobility of the formation. For example, according to various embodiments, automated agents configured as follower agents can receive movement information corresponding to movements of only a subset of the adjacent automated agents, typically those that are directly adjacent or nearest the autonomous agent in a particular direction. For example, in some embodiments, a control system for a particular autonomous agent will consider only the subset of adjacent automated agents that are in the direction that the autonomous agent is traveling, i.e., ahead of the autonomous agent, and/or those adjacent autonomous agents that are moving alongside the autonomous agent. By way of another example, in some embodiments, a control system for a particular autonomous agent will consider only the subset of adjacent autonomous agents that are detectable via a sensor onboard the particular autonomous agent. These aspects can overlap when, for example, a sensor is configured to scan for neighboring autonomous agents in the forward or sideways directions from an autonomous agent.

Modeling with and without Delayed Self-Reinforcement (DSR)

The process of aligning individual autonomous agents can be better understood with reference to simulated data, with individual agents denoted 'i', as follows. The alignment of each individual i to its neighbors $N_i$, based on the information available from its neighbors, is modeled below. New information $I_i(k+1)$ for the $i^{th}$ individual be found from the information update $[I_i(k+1)-I_i(k)]$ given by:

$$[I_i(k+1)-I_i(k)]=-K_s\Delta_i(k)\delta_t+\beta[I_i(k)-I_i(k-1)], \quad \text{Equation 8}$$

where different integers k represent the update time instants $t_k=k\delta t$, the time interval between updates $\delta t$ depends on the reaction time of the individual, $\beta$ represents the gain of the delayed self-reinforcement using the previous update $[I_i(k)-I_i(k-1)]$ of information, $K_s$ is the alignment strength, and $\Delta_i(k)$ is the average difference in the information between the individual and its $|N_i|$ neighbors $$\Delta_i(k) = \frac{1}{|N_i|} \sum_{j \in N_i} [I_i(k) - I_j(k)]. \quad \text{(Equation 9)}$$

The set of neighbors $N_i$ can be based on metric distance or topological distance. In this model, the set of neighbors $N_i$ also includes the information source $I_s$ when the individual i is a leader with direct access to the source, or is the individual that initiates the change in information in the system. Note that the model corresponds to the standard diffusion-based information update if the DSR gain $\beta$ in Equation 8 is set to zero, $\beta=0$, e.g., as in (8, 9).

Information Transfer Improvement with DSR

Figure 8:
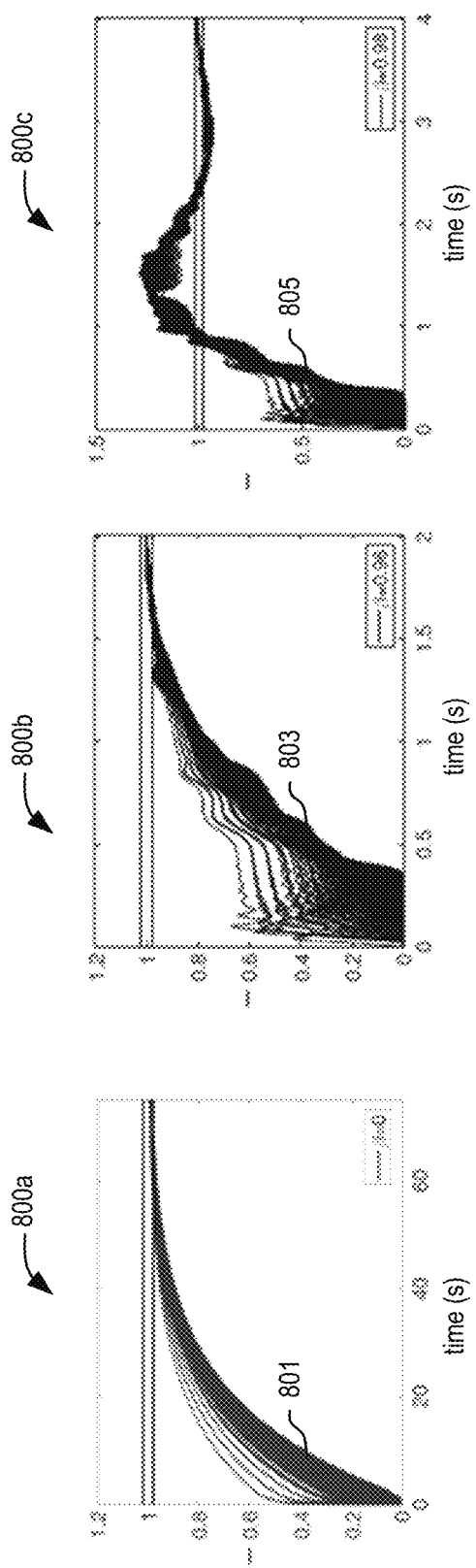
FIG. 8 is a graphical comparison of settling time $T_s$ needed for information I in a group of autonomous agents to reach and stay within ±2% of the final value of one.

For a given system response time (i.e., information update time $\delta t$), DSR can lead to substantial performance improvement when compared to the standard diffusive information transfer without the DSR as illustrated in FIG. 8. FIG. 8 is a set of graphical representations comparing settling time $T_s$ needed for information I in a group of autonomous agents to reach and stay within ±2% of the final value of one. In general, the information transfer improves when the alignment strength $K_s$ is increased. However, the maximum value of the alignment strength $K_s$ is bounded for a fixed update time $\delta t$ to ensure stability. As shown in 800*a*, even with the alignment strength selected high as Ks=100 (which is close to the instability) the settling time Ts, needed for all the individual responses 801 to become close (within 2%) and stay close to the maximum value of the source information, is 69 s without the DSR. Increasing the DSR gain $\beta$ above zero tends to improve the information transfer, however, at large values close to one, oscillations in the response increase leading to distortions in the information transfer as seen in FIG. 8.

With the DSR gain selected to avoid oscillations, $\beta=0.96$, the DSR leads to a substantial (more than an order) reduction in the settling time for individual responses 803 from 69 s to 1.72 s as seen in graph 800*b* of FIG. 8. Such improvement in the settling time with the DSR helps to increase the bandwidth of information that can be transferred without distortion. For example, with DSR, good tracking of information pulses can be expected provided the time period $T_p$ of such pulses are greater than twice the settling time of $T_s=1.72$ s. Without DSR, similar substantial improvements are not possible when the update time interval is kept fixed at $\delta t=0.01$ s since increases in the alignment strength leads to instability. Thus, for a given update rate $\delta t$, the proposed DSR leads to better transfer of rapidly changing information when compared to the standard case without the DSR. Further increasing the gain, e.g., to 0.98, can result in oscillatory undamped behavior as illustrated by individual responses 805 in graph 800*c* of FIG. 8.

Impact of DSR on Flocking

Figure 9:
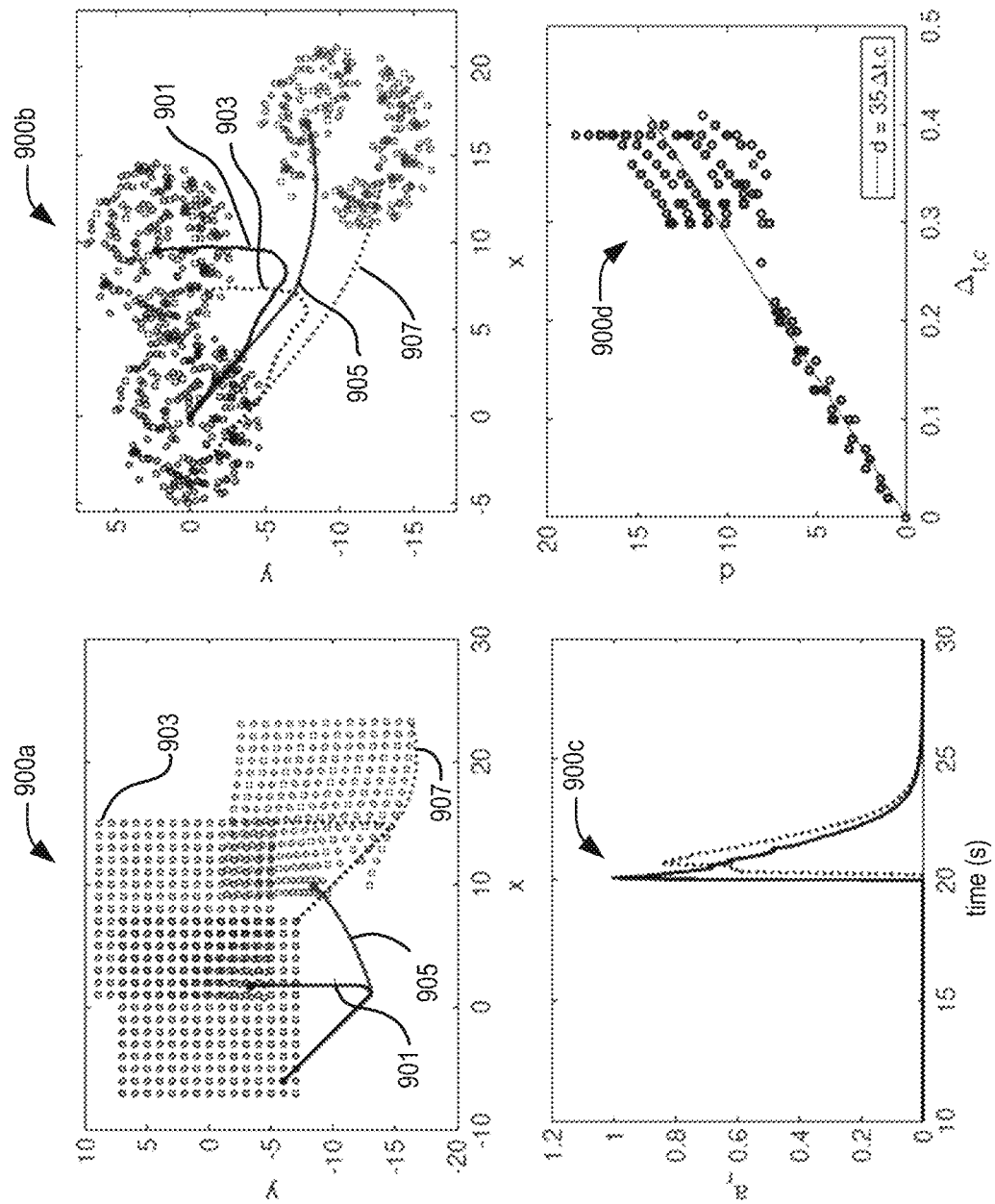
FIG. 9 is a graphical comparison of cohesiveness of a constant-speed v maneuver from initial direction of $-\pi/4$ to $\pi/2$ with and without dynamic self-reinforcement.

Delayed self-reinforcement can improve the cohesiveness of flocking maneuvers, when the orientation of each individual autonomous agent is considered to be the information I being transferred using local alignment to neighbors. To illustrate, the position components $x_i$, $y_i$ of each individual is updated as $$x_i(k+1)=x_i(k)+v\delta_t \cos I_i, \; y_i(k+1)=y_i(k)+v\delta_t \sin I_i, \quad \text{(Equation 10)}$$

where v is the fixed speed of each individual. To focus on the impact of orientation-information transfer on the maneuver, other effects such as speed changes or strategy changes to maintain spacing between individuals or density are not included in the simulations. Note that the set of neighbors can change during these simulations, however, the initial spacing is selected to ensure that each individual has at least two neighbors. The results in FIG. 9 show that the use of DSR leads to improved cohesiveness in maneuvers when compared to the case without DSR. For both cases, uniform and random initial distribution, the maneuver with DSR is more cohesive as seen in the similarity of the initial and final formations when compared to the case without the DSR, and also seen in the FIGS. 13-16.

Even with the addition of noise in the information update, the overall motion remains cohesive. For example, FIG. 9 is a graphical comparison of cohesiveness of a constant-speed v maneuver from initial direction of $-\pi/4$ to $\pi/2$ with and without dynamic self-reinforcement. In the first and second graphs 900*a* and 900*b* of FIG. 9, for example, the turn movement of a leader 901 is similar to that of an individual which is farther away 903, which is an important feature in biological flocks which exhibit equal-radius (parallel) trajectories. In contrast, without DSR, the final direction of a leader 905 is different from that of individuals farther away 907. Moreover, the slower transfer of turn-information leads to a larger turn radius without the DSR when compared to the case with the DSR. The time shift $\Delta_{t,c}$ needed for the individual radial acceleration to best correlate with the radial acceleration of the leader varies linearly with distance d from the leader (for individuals close to the leader), with the DSR approach, as seen at 900*d*. The overall speed of information transfer across the group is 47 m/s, where the correlation time delay $\Delta_{t,c}$ is 0.389 s for a distance of 18.38 m. Moreover, the magnitude of the radial acceleration does not reduce substantially with distance from the leader, as seen at 900*c*. Both these features, linearity of the information transfer with time and low distortion, are indicative of superfluid-like flow of information observed in nature that cannot be explained by standard diffusion models. Thus, the proposed DSR of the standard diffusion model captures the superfluid-like turning maneuvers observed in nature.

Superfluid-Like Behavior with DSR

To understand the impact of the DSR gain $\beta$ selection on capturing the superfluid-like behavior in the results in FIG. 8, the information update in Equation 8 is first rewritten as $$\frac{\beta}{\delta_i}\{[I_i(k+1) - I_i(k)] - [I_i(k) - I_i(k-1)]\} + \quad \text{(Equation 11)}$$

$$\frac{1+\beta}{\delta_t}[I_i(k+1) - I_i(k)] = -K_s\Delta_i(k),$$

and then approximated, when the update interval δt is small compared to the information-transfer response, as $$\beta\delta_i\frac{d^2}{dt^2}I(t) + (1-\beta)\frac{d}{dt}I(t) = \frac{\alpha^2}{4}K_s\nabla^2 I(t) \quad \text{(Equation 12)}$$

where a is the average distance to the neighbors and $\nabla^2$ represents the Laplacian. This approximate model captures a broad set of behaviors. Note that as the DSR gain β tends to one from zero, the damping term (1−β) tends to zero and the overall behavior changes from overdamped (e.g., β=0) to being critically damped (e.g., β=0.96) to oscillatory undamped (e.g., β=0.98), as seen in FIG. 8.

Large oscillations can lead to distortions in the information loss, and ideally the DSR gain β is tuned to be close to critical damping. For small DSR gain β→0, the DSR dynamics approximates the overdamped standard diffusion-type information transfer $$\frac{d}{dt}I(t) = \frac{\alpha^2}{4}K_s\nabla^2 I(t). \quad \text{(Equation 13)}$$

With a larger DSR gain β→1, the DSR dynamics approximates the superfluid-type information transfer observed in nature, i.e.

$$\frac{d^2}{dt^2}I(t) = \frac{a^2 K_s}{4\delta_t}\nabla^2 I(t) = c^2\nabla^2 I(t) \quad \text{(Equation 14)}$$

where a smaller update time δt (which is possible if the individuals can respond faster) leads to a larger speed of information propagation c.

Figure 10:
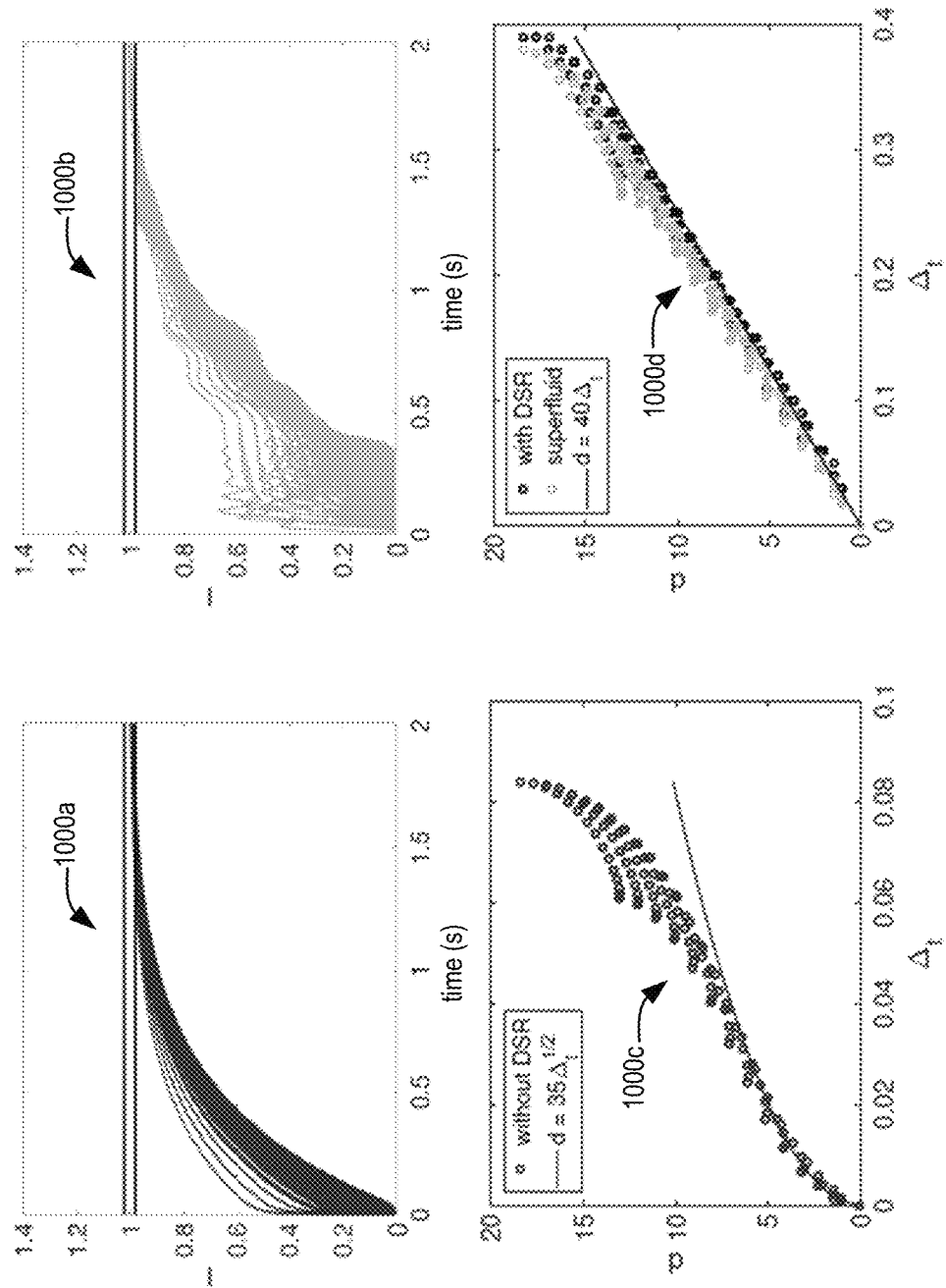
FIG. 10 is a graphical comparison of information transfer with and without dynamic self-reinforcement in a case dataset.

Both the standard diffusive model and the second-order superfluid-type model in Equation 12 can achieve faster information transfer, similar to the case with the use of DSR, as seen in FIG. 10. FIG. 10 is a series of graphs providing graphical comparison of information transfer with and without delayed self-reinforcement in a case dataset. Graph 1000*a* illustrates the time required for individual responses to come within 2% of the final value with DSR; and graph 1000*b* illustrates the same with an increase in the DSR gain selected to avoid oscillations. As shown in graph 1000*a*, the settling time with the standard diffusive model is 1.72 s (with the alignment strength $K_s$ increased about 40 times, from 100 to 4011) and with the superfluid-like model in Equation 12 is 1.78 s, which are similar to the settling time of 1.72 s with the DSR. However, the standard diffusive model requires a proportional decrease in update time by about 40 times, from 0.01 s to 2.49×10⁻⁴ s to maintain stability. With the same update time of 2.493×10⁻⁴ s, the superfluid-like model was unstable, and hence, the results in FIG. 10 are shown with the update time reduced by half, i.e., to 1.246×10⁻⁴ s. Note that the information transfer distance is linear in time t with the DSR as seen in graph 1000*d* of FIG. 10, for individuals close to the leader, which is expected for the relationship of the information-transfer distance with time with the superfluid-type model.

In contrast, the information transfer distance d is proportional to the square root of time Δt with the standard diffusion model, as shown in graph 1000*c* of FIG. 10. The speed of information transfer with DSR is close to the expected value for the superfluid case from the expression of c in Equation 14. In particular, with an average distance of a=1, alignment strength Ks=100 and update time δt=0.01, the predicted speed c in Equation 14 is c=50 m/s. This is close to the speed of information transfer seen in the results in FIG. 3, In particular, the change in the information is transferred across the group over a distance of 18.38 m in 0.39 s, i.e., at a speed of 47 m/s. Thus, the use of the DSR neighbor-based alignment achieves the superfluid-type information transfer, and increases the overall information transfer rate in the group without requiring a corresponding increase in individual information-update rate. In contrast, current superfluid-like model and standard diffusion models can only achieve the faster information transfer by increasing the individual, information-update rate.

Materials and Methods

Bound on Alignment Strength for a Given Update Rate

The 225 individuals were placed in a 25×25 regular array as in FIG. 9 graph 900*a*, where the spacing in the x and y direction was 1 m. The neighborhood $N_i$ of each individual i was considered to be a disc of radius r=1.2 m from the individual i. Thus, the average distance of individuals in the neighborhood was a=1 m. The leader is the individual shown as a solid black dot in FIG. 9 graph 900*a*, i.e., second from the left agent on the second row from the bottom. The initial value of the source information $I_s$ and of all the individuals I is zero. The source information $I_s$ is switched to one at the start of the simulations at time step k=1. With the standard diffusion model (i.e., without DSR) the information transfer becomes unstable as the alignment strength $K_e$ is increased to $K_s$=101 (from $K_s$=100 used in the results shown in FIG. 8) when the update time is kept fixed at δt=0.01. With a smaller alignment strength $K_s$=100, the DSR gain β was varied from 0 to 0.99 and the gain of β=0.96 was selected to yield a fast response without overshoot. The simulations were performed in MATLAB software.

Flocking Maneuver Simulations

The desired information source his switched from an initial value of −π/4 to the final value of π/2 for the simulations in FIG. 9. For the case in graph 900*b* of FIG. 9, the initial locations were randomly chosen in a disc of radius $r_d$=25/3, which was selected to be small enough to ensure that there was at-least two individuals in each neighborhood $N_i$. The radial distance $r_i$ from the center was chosen to be the square root of a uniformly-distributed random variable between 0 and $r_d$ and the angle $\theta_i$ was selected to be randomly distributed between 0 and 2π radians to yield the initial locations as $x_i=r_i \cos(\theta_i)$ and $y_i=r_i \sin(\theta_i)$. Moreover, a uniformly-distributed random noise (between −0.025 rads and 0.025 rads) was added to the estimates of the averaged-neighbor orientation information update in Equation 8.

Superfluid-Like Simulations

The superfluid-like simulations, were computed based on Equation 12 as $$I(k+1) = I(k) + \dot{I}(k)\hat{\delta}_t \quad \text{(Equation 15)}$$

$$\dot{I}(k+1) = \dot{I}(k) - \frac{(1-\beta)}{\beta\delta_t}\dot{I}(k)\hat{\delta}_t + \frac{K_s}{\beta\delta_t}\Delta_i(k)\hat{\delta}_t$$

where the update rate was $\hat{\delta}_t$=1.246×10⁻⁴ s.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system for controlling navigation of an automated vehicle in response to movement of adjacent automated vehicles, the system comprising:
   an automated vehicle in formation with adjacent automated vehicles, the automated vehicle comprising a sensing device configured to detect movement of the adjacent automated vehicles; and
   a controller comprising at least one processor and a memory device containing executable instructions that, when executed by the at least one processor, cause the controller to:
   determine an average movement of a subset of the adjacent automated vehicles over a first period of time based on output of the sensing device;
   generate course correction data based on the average movement of the subset of the adjacent automated vehicles over the first period of time;
   determine time-delayed movement data corresponding to a prior change in position of the automated vehicle over a second period of time preceding the first period of time;
   augment the course correction data based on the time-delayed movement data to generate augmented course correction data, wherein the augmented course correction data can be expressed as a function of a time derivative of a state $z_i(s)$ according to equation:

$$\dot{z}_i(s) = -\alpha\beta K_i Z(s) + \alpha\beta B_{iZs}(s) + \left(\frac{1-e^{-\tau s}}{\tau}\right)v_i(s).$$

wherein $\dot{z}_i(s)$ is the time derivative of the state $z_i(s)$, and $v_i(s)$ is a function of the time-delayed movement data; and
   instruct the automated vehicle to move based on the augmented course correction data.

2. The system of claim 1, wherein:
   the adjacent automated vehicles comprise a convoy of autonomous ground vehicles configured to operate on a road; and
   the automated vehicle is instructed to move so as to cause the automated vehicle to maintain formation with the convoy.

3. The system of claim 1, wherein:
   the adjacent automated vehicles comprises a formation of unmanned aerial vehicles configured to operate in a three-dimensional airspace; and
   the automated vehicle is instructed to move so as to cause the automated vehicle to maintain formation with the formation.

4. A method for controlling navigation of an automated agent in response to movement of adjacent automated agents, the method comprising:
   receiving movement data indicative of an average movement of a subset of the adjacent automated agents neighboring the automated agent, with respect to the automated agent over a first period of time;
   generating course correction data based on the movement data;
   determining time-delayed movement data corresponding to prior movement of the automated agent over a second period of time preceding the first period of time;
   augmenting the course correction data based on the time-delayed movement data to generate augmented course correction data, wherein the augmented course correction data can be expressed as a function of a time derivative of a state $z_L(s)$ according to equation:

$$\dot{z}_i(s) = -\alpha\beta K_i Z(s) + \alpha\beta B_{iZs}(s) + \left(\frac{1-e^{-\tau s}}{\tau}\right)v_i(s).$$

wherein $\dot{z}_i(s)$ is the time derivative of the state $z_i(s)$, and $v_i(s)$ is a function of the time-delayed movement data; and
   instructing the automated agent to move based on the augmented course correction data.

5. The method of claim 4, further comprising, for each adjacent automated agent:

receiving respective movement data indicative of an average movement of a subset of the adjacent automated agents neighboring the respective adjacent automated agent over the first period of time;

generating respective course correction data based on the respective movement data;

determining respective time-delayed movement data corresponding to prior movement of the adjacent automated agent over the second period of time preceding the first period of time;

augmenting the respective course correction data for the adjacent automated agent based on the time-delayed movement data to generate respective augmented course correction data; and instructing each adjacent automated agent to move based on the respective augmented course correction data corresponding to each adjacent automated agent such that the automated agent and adjacent automated agents move together in formation.

6. The method of claim 4, further comprising:
instructing a leader agent of the adjacent automated agents to move independent of a remainder of the adjacent automated agents.

7. The method of claim 4, wherein the time-delayed movement data comprises previously applied augmented course correction data corresponding to the second period of time.

8. The method of claim 4, wherein the time-delayed movement data comprises averaged movement data indicative of movement of the adjacent automated agents over the second period of time.

9. The method of claim 4, wherein the movement data comprises averaged movement data corresponding the subset of adjacent automated agents ahead of or alongside the automated agent with reference to a direction of movement of the automated agent.

10. The method of claim 4, further comprising:
applying a low-pass filter to $v_i(s)$ prior to augmenting the course correction data.

11. A system, comprising:
an automated agent in formation with one or more adjacent automated agents; and a controller comprising at least one processor and a memory device containing executable instructions that, when executed by the at least one processor, cause the controller to:

determine an average movement of a subset of the one or more adjacent automated agents over a first period of time;

generate course correction data based on the average movement of the one or more adjacent automated agents; and determine time-delayed movement data corresponding to prior movement of the automated agent over a second period of time preceding the first period of time;

augment the course correction data based on the time-delayed movement data to generate augmented course correction data, wherein the augmented course correction data can be expressed as a function of a time derivative of a state $z_i(s)$ according to equation:

$$\dot{z}_i(s) = \alpha\beta K_i Z(s) + \alpha\beta B_i z_s(s) + \left(\frac{1-e^{-\tau s}}{\tau}\right) v_i(s).$$

wherein $\dot{z}_i(s)$ is the time derivative of the state $z_i(s)$, and $v_i(s)$ is a function of the time-delayed movement data; and instruct the automated agent to move based on the augmented course correction data.

12. The system of claim 11, wherein:
the one or more adjacent automated agents comprise a leader agent and a follower agent; and
the augmented course correction data is configured to cause the follower agent to convoy behind the leader agent.

13. The system of claim 11, wherein:
the automated agent and the one or more adjacent automated agents comprise a plurality of autonomous ground vehicles; and
the augmented course correction data is configured to cause the automated agent to drive in formation with the plurality of autonomous ground vehicles.

14. The system of claim 11, wherein:
the automated agent and the one or more adjacent automated agents comprise a plurality of unmanned aerial vehicles; and
the augmented course correction data is configured to cause the automated agent to fly in formation with the plurality of unmanned aerial vehicles.

15. The system of claim 11, wherein:
the automated agent further comprises a sensing device configured to sense the subset of the one or more adjacent automated agents; and
the memory device contains further executable instructions that, when executed by the at least one processor, further cause the controller to determine the average movement of the subset of the one or more adjacent automated agents based on output of the sensing device.

16. The system of claim 11, wherein:
the one or more adjacent automated agents comprise a leader agent and a plurality of follower agents, the plurality of follower agents arranged in formation following the leader agent; and
the memory device contains further executable instructions that, when executed by the at least one processor, further configure the controller to, for each:
determine a respective average movement of a subset of the one or more adjacent automated agents neighboring the follower agent over the first period of time;
determine respective course correction data based on the respective average movement of
determine respective time-delayed movement data corresponding to prior movement of the respective follower agent over the second period of time;
augment the respective course correction data based on the respective time-delayed movement data to generate respective augmented course correction data for each one of the follower agents; and
instruct the follower agents to move based on the respective augmented course correction data such that the follower agents move in formation with the leader agent.

17. The system of claim 16, wherein the subset of the one or more adjacent automated agents neighboring each comprises automated agents located forward of or alongside the respective follower agent in the formation, with respect to a direction of travel of.

18. The system of claim 16, wherein the subset of the one or more adjacent automated agents neighboring each comprises automated agents located within a sensing range of a sensor connected with the respective follower agent.

* * * * *